United States Patent [19]

Ishiguro et al.

[11] Patent Number: 4,919,103
[45] Date of Patent: Apr. 24, 1990

[54] DEVICE FOR CONTROLLING EVAPORATIVE EMISSION FROM A FUEL TANK

[75] Inventors: Yuji Ishiguro, Toyohashi; Hiroyuki Hosokawa, Chita; Nobuhiko Koyama, Nagoya; Eiji Hiramatsu, Anjo; Mitsunori Takao, Kariya; Tomoaki Abe, Oobu; Masashi Kiyono, Anjo; Katsuya Maeda, Kariya; Shigeru Kamio, Nagoya, all of Japan

[73] Assignee: Nippondenso Co., Ltd., Kariya, Japan

[21] Appl. No.: 145,909

[22] Filed: Jan. 20, 1988

[30] Foreign Application Priority Data

Feb. 28, 1987 [JP] Japan .................. 62-45825
Apr. 20, 1987 [JP] Japan .................. 62-96859

[51] Int. Cl.$^5$ ............................................. F01M 25/00
[52] U.S. Cl. ..................................... 123/514; 123/519; 123/527; 123/509
[58] Field of Search ............... 123/514, 516, 518, 519, 123/520, 521, 557, 509

[56] References Cited

U.S. PATENT DOCUMENTS

| | | | |
|---|---|---|---|
| 3,372,679 | 3/1968 | Aitken | 123/519 |
| 3,757,753 | 9/1973 | Hunt | 123/519 |
| 4,546,750 | 10/1985 | Brunell | 123/514 |
| 4,598,686 | 7/1986 | Lupoli | 123/519 |
| 4,672,937 | 6/1987 | Fales | 123/514 |
| 4,701,198 | 10/1987 | Uranishi | 123/519 |
| 4,715,345 | 12/1987 | Reames | 123/514 |
| 4,747,388 | 5/1988 | Tuckey | 123/514 |

FOREIGN PATENT DOCUMENTS

| | | | |
|---|---|---|---|
| 2460101 | 6/1976 | Fed. Rep. of Germany | 123/514 |
| 2844053 | 4/1980 | Fed. Rep. of Germany | 123/509 |
| 0161952 | 12/1980 | Japan | 123/519 |
| 58-133466 | 8/1983 | Japan | |
| 59-5177 | 2/1984 | Japan | |
| 61-23458 | 2/1986 | Japan | |

*Primary Examiner*—Carl S. Miller
*Attorney, Agent, or Firm*—Cushman, Darby & Cushman

[57] ABSTRACT

An apparatus for treating fuel vapor, such as in a motor vehicle fuel tank, by subjecting it to adsorption treatment to prevent its direct emission into the atmosphere. The apparatus according to the present invention comprises a fuel tank, a partitioning wall provided within the fuel tank to define a small fuel storage chamber within the fuel tank, a canister container housed in the small fuel storage chamber, the canister container storing therein a fuel adsorbing material. When fuel feeding takes place, feeding fuel is introduced into the small fuel storage chamber to cool the canister container. However, when the engine is operated, high temperature return fuel is introduced into the small storage chamber to heat the canister container thereby promoting the adsorbing and de-adsorbing action of fuel by the fuel adsorbing material.

12 Claims, 6 Drawing Sheets

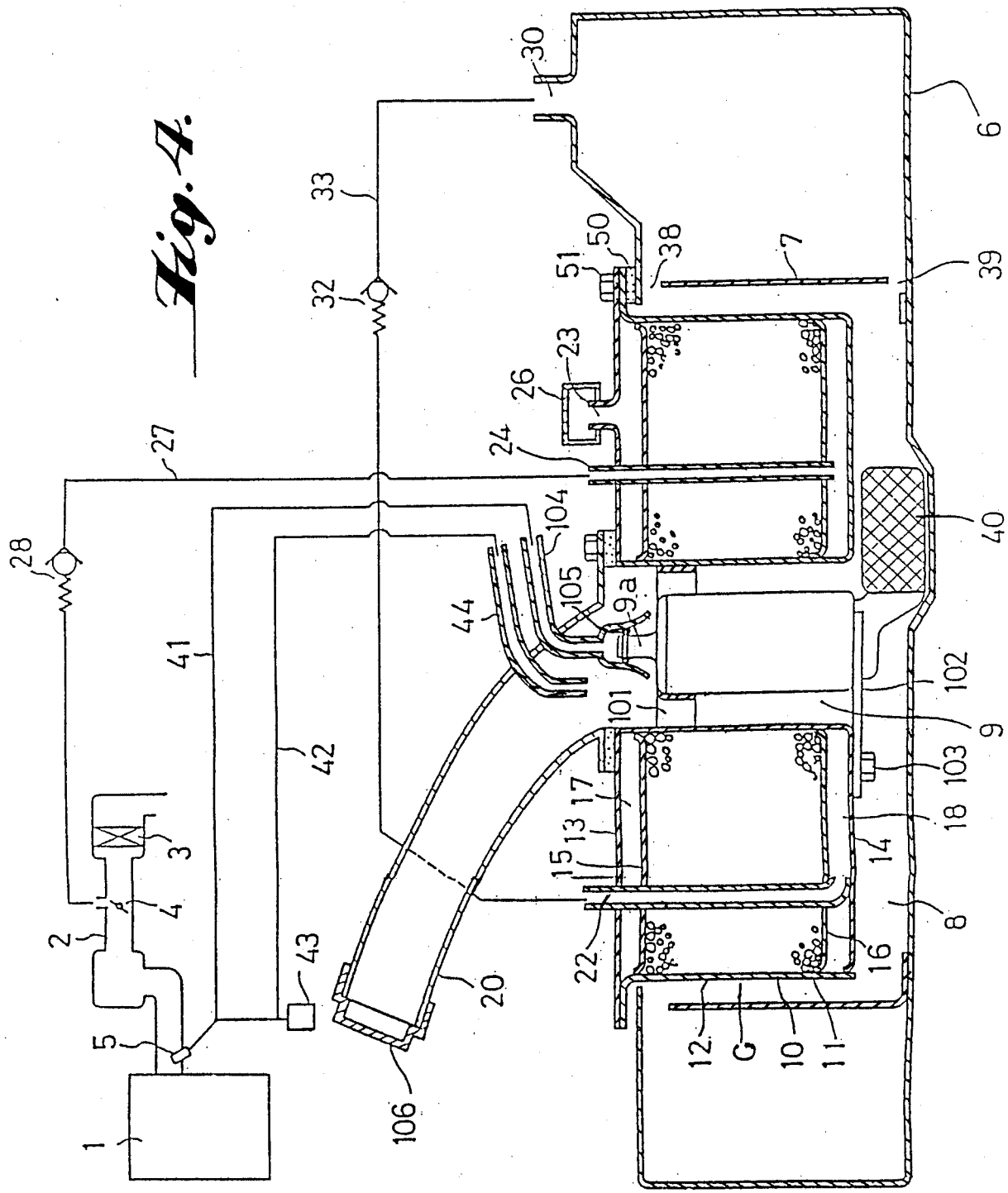

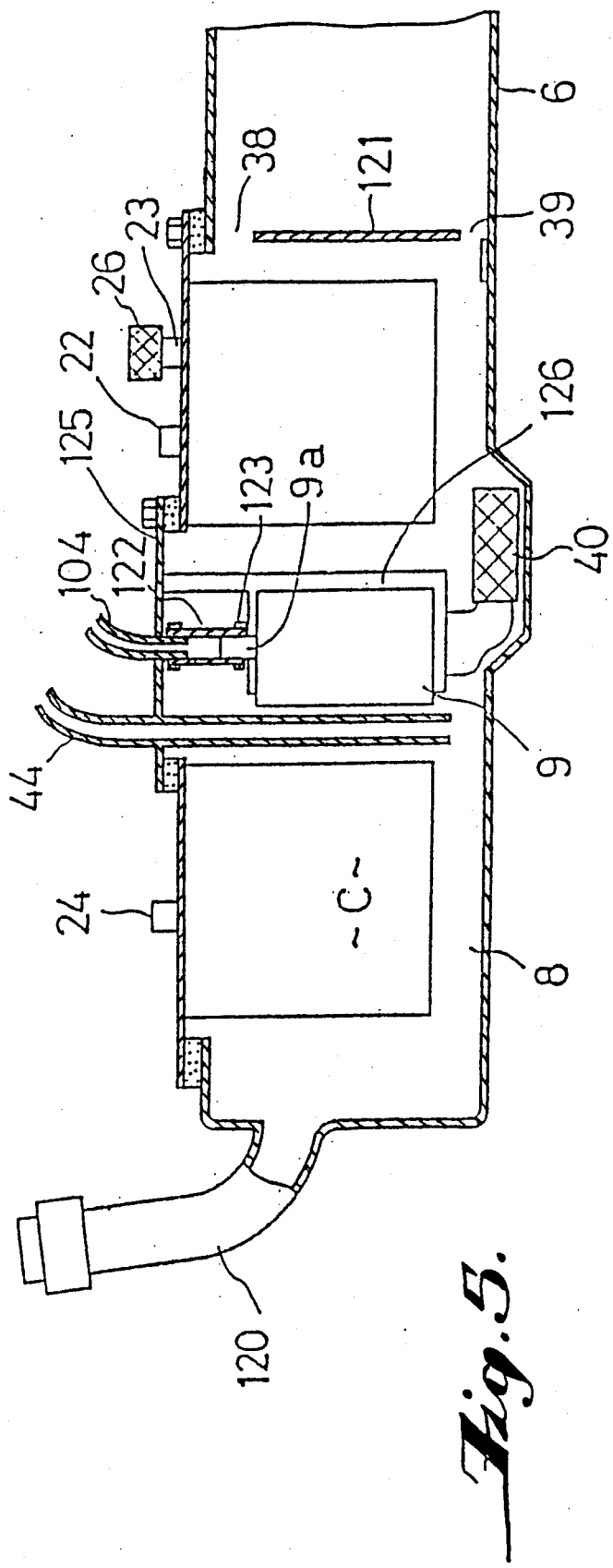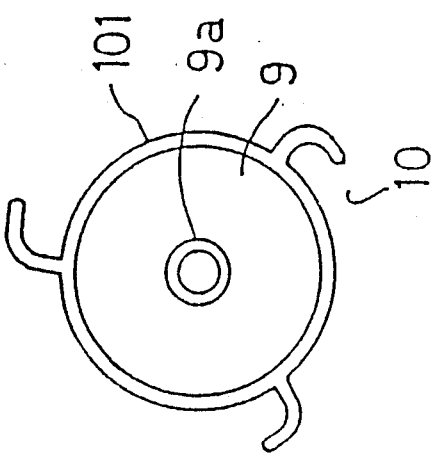

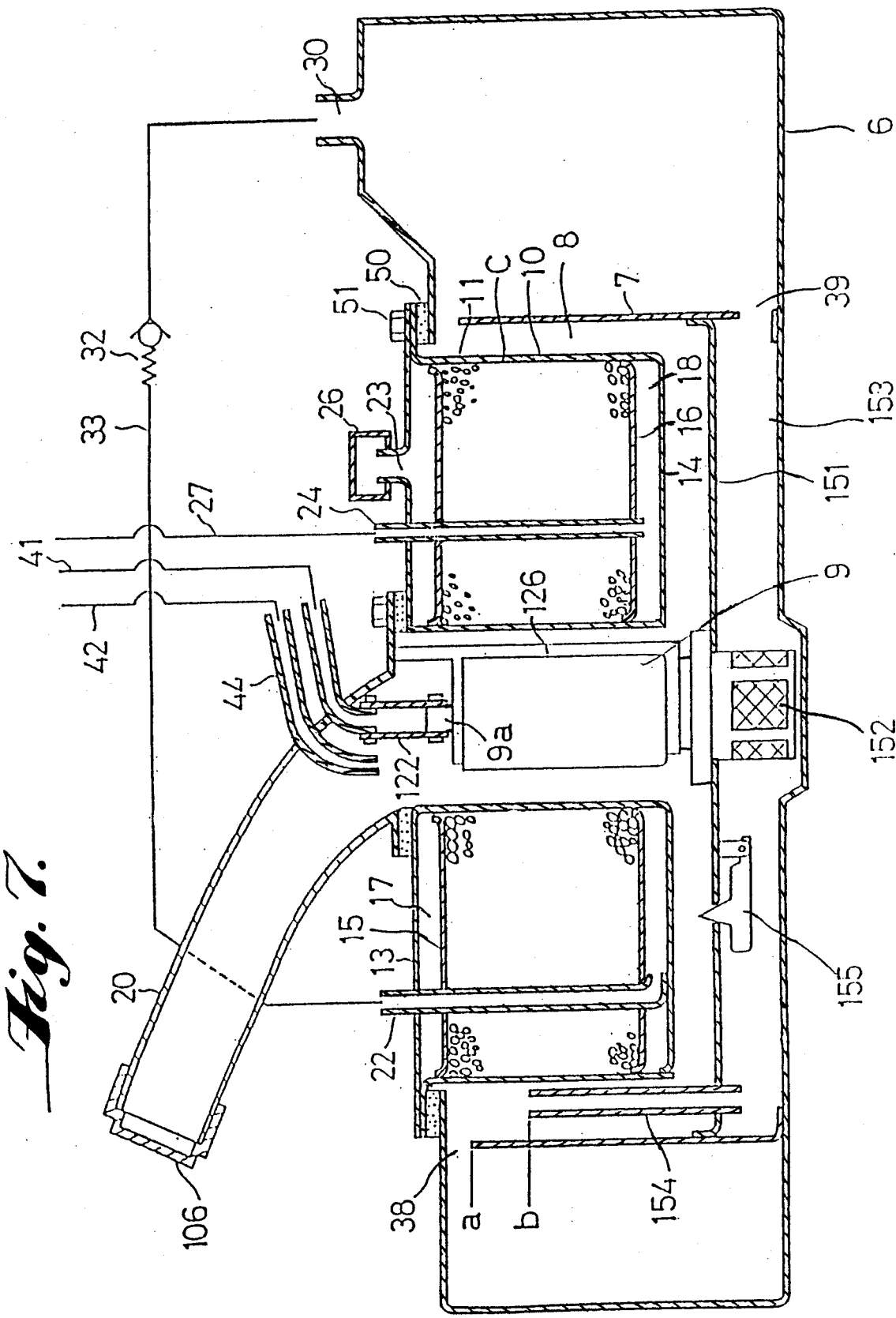

DEVICE FOR CONTROLLING EVAPORATIVE EMISSION FROM A FUEL TANK

BACKGROUND OF THE INVENTION

1. Field of the Invention

The present invention relates to an apparatus for treating evaporative fuel (fuel vapor) in which fuel evaporated within a fuel storage chamber such as, for example, a fuel tank of a vehicle, is subjected to adsorption treatment to prevent direct emission of evaporated fuel into the atmosphere.

2. Description of the Prior Art

An apparatus is known, as disclosed, for example, in Japanese Utility Model Publication laid open No. 23458/1986, in which, in order to prevent fuel vapors which naturally form within a vehicle's fuel tank from being scattered into the atmosphere, a canister is placed at a bottom of the fuel tank and connected to the fuel tank. An adsorbing material such as activated carbon is stored within the canister. To enhance the adsorbing performance of the material stored in the canister, cool feeding fuel is circulated to the bottom of the fuel tank to cool the canister. However, the canister arrangement shown in that publication is low in adsorbing ability. It adsorbs only fuel vapors that are evaporated within the fuel tank during normal running of the vehicle.

It has been recently found that a considerable amount of fuel vapor is generated at the time of gasoline feeding (when the fuel tank is being filled). This fuel vapor escapes into the atmosphere and contaminates it. It is also harmful to human beings. Therefore, it is desireable to provide an arrangement that has the ability to treat fuel vapors that are generated at the time of fuel feeding. If an attempt is made to adsorb the evaporative fuel by the canister arrangement known in the prior art, a large amount of fuel adsorbing material is required because of a great amount of evaporative fuel generated during gasoline feeding. Thus, a large-size canister has to be used, posing a structural problem of mounting it on the vehicle.

Moreover, the fuel vapor generated at gasoline feeding is generated rapidly and must therefore be adsorbed in a short period of time. When evaporative fuel is adsorbed in a short period of time, there is much heat of adsorption which causes the temperature of the fuel adsorbing material to increase quickly. The increase of temperature of the fuel adsorbing material deteriorates its adsorbing ability.

It has also been recently found that adsorbing and de-adsorbing performances of such materials are greatly influenced by canister temperature. When the canister is cooled, the adsorbing performance is enhanced and conversely, when the canister is warmed, the de-adsorbing performance of the adsorbed fuel is enhanced. The structural arrangement of the prior art does not have sufficient heat exchanging capacity between the canister and the feeding fuel to adequately cool the fuel adsorbing material at gasoline feeding. When the engine is operated, the canister temperature is substantially the temperature of its environment, i.e. the temperature in the fuel tank. The canister temperature is not significantly cooled by incoming fuel to enhance adsorbing performance or warmed to enhance de-adsorbing performance.

The present invention provides an apparatus for treating evaporative fuel that has a relatively small and simple mechanical structure and provides a marked improvement in adsorbing and de-adsorbing performance with respect to prior art devices.

SUMMARY OF THE INVENTION

According to the present invention, a partitioning wall is provided within the fuel tank to define a small fuel storage chamber within the fuel tank. A canister container is housed within the small fuel storage chamber. In this canister container is stored a fuel adsorbing material. When fueling takes place, incoming fuel is introduced into the small fuel storage chamber to cool the canister container to enhance its fuel adsorbing performance; whereas when the engine is being operated, high temperature return fuel is introduced into the small storage chamber to heat the canister container to promote de-adsorbing action of the material stored in the canister container.

Low temperature feeding fuel is introduced into the small fuel storage chamber when fueling takes place, to cool the canister container and carry away adsorption heat generated during fuel feeding. During normal operation of the vehicle, high temperature return fuel from the vehicle's fuel injection system is introduced into the small fuel storage chamber to heat the container and enhance the de-adsorbing action of the material stored in the canister container.

As described above, in the present invention, the canister container is cooled by low temperature feeding fuel during fueling and is heated by the high temperature return fuel during normal vehicle operation. Therefore, according to the present invention, a separate cooling and heating apparatus are not needed, which simplifies the apparatus. Because the canister container is housed in the fuel tank, an extra space is not needed which makes the apparatus smaller in size. Moreover, a large capacity fuel tank is subdivided by a partitioning wall to define a small fuel storage chamber which receives the canister container. Therefore, a small thermal capacity will suffice, and there is efficient heat transfer between the low temperature feeding fuel and high temperature return fuel.

BRIEF DESCRIPTION OF THE DRAWINGS

FIG. 4 is a sectional view of the entire system of a fourth embodiment of the present invention;

FIG. 5 is an explanatory view of a pump holder forming a part of the present invention;

FIG. 6 is a sectional view showing the entire system of a fifth embodiment of the present invention;

FIG. 7 is a sectional view showing the entire system of a sixth embodiment of the present invention;

DETAILED DESCRIPTION OF THE PREFERRED EMBODIMENTS

Figure 1:
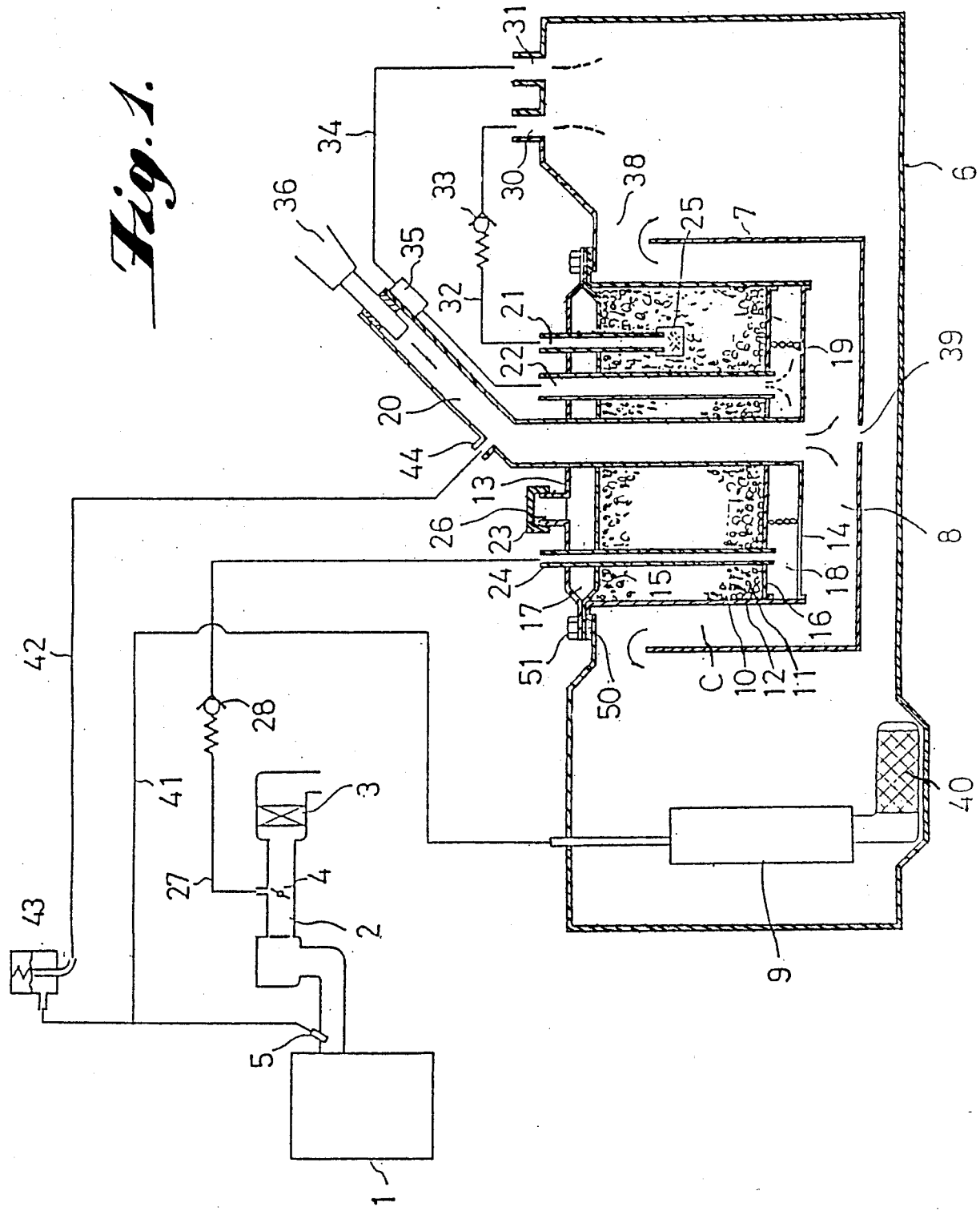
FIG. 1 is a sectional view showing the entire system of a first embodiment of the present invention.

FIG. 1 shows a first embodiment of the invention in a part schematic and part sectional view. A fuel tank 6 stores fuel for operating an engine 1. The fuel is pumped by a fuel pump 9 via a fuel pipe 41 to a fuel injection valve 5. Fuel injection valve 5 injects fuel into an intake passage 2 from which intake air, cleaned by an air cleaner 3 and throttled by a throttle valve 4 flows into the engine.

The fuel tank 6 in internally provided with a sub-tank 7 formed by a partitioning wall (R.N.). Sub-tank 7 defines a small fuel storage chamber 8 within the fuel tank 6. In addition to its other functions described below, fuel storage chamber 8 also minimizes the pitch and roll of fuel within the fuel tank 6.

Fuel pump 9 is housed within the fuel tank 6, and in the FIG. 1 embodiment, the fuel pump is installed externally of the sub-tank 7.

A canister C is housed in the small fuel storage chamber 7. A fuel adsorbing material, for example, activated carbon 11, is stored in a canister container 10. The canister container 10 is formed by airtightly welding an upper plate 13 and a lower plate 14 to a container side wall 12 in the form of a doughnut. This canister container 10 is interiorly provided with an upper perforated plate 15 and a lower perforated plate 16 formed of punching metal vertically opposed to each other. The fuel adsorbing material 11 is filled between perforated plates 15 and 16.

The upper perforated plate 15 is secured to the upper plate 13 while securing an upper space 17 relative to the upper plate 13 whereas the lower perforated plate 16 is urged by means of a spring 19 while securing a lower space 18 relative to the lower plate 14.

To the upper plate 13 is secured a fuel feeding pipe 20, a tank port 21, a refuelling port 22, an atmospheric port 23 and a purge port 24 by means such as welding.

The fuel feeding pipe 20 is communicated with the small fuel storage chamber 8 through a central hole of the container side wall 12 in the form of a doughnut.

The refuelling port 22 and the purge port 24 are in communication with the lower space 18; the atmospheric port 23 is in communication with the upper space 17; and the tank port 21 is opened into the fuel adsorbing material 11 through a mesh filter 25. A filter 26 is attached to the atmospheric port 23.

The purge port 24 is connected to the intake passage 2 of the engine, particularly in the vicinity of the throttle valve 4 through a negative pressure conduit 27, and the negative pressure conduit 27 has a check valve 28 mounted thereon which merely allows a flow in a direction from the side of the purge port 24 to the side of the intake passage 2 of the engine.

The thus constructed canister C is secured to the upper part of the fuel tank 6 by means of a bolt 51 through a gasket 50. This securement causes the canister C to be housed in the sub-tank 7 and being positioned approximately in the central portion of the small fuel storage chamber 8.

The sub-tank 7 is secured to the upper surface of the fuel tank 6 by welding or the like, an opening 38 serving as an overflow passage of fuel is provided between the sub-tank 7 and fuel tank 6, and a small hole 39 is open to the bottom wall in the central portion of the sub-tank 7.

In the upper surface of the fuel tank 6 are provided, by means such as welding, a discharge port 30 for discharging evaporative gasoline generated within the fuel tank at the time other than feeding, and a release port 31 for discharging evaporative gasoline generated within the fuel tank 6 at the time of feeding.

The discharge port 30 is connected to the tank port 21 through a conduit 32, and a check valve 33 is provided on the conduit 32. Accordingly, evaporative gasoline generated within the fuel tank 6 at a time other than feeding is introduced into the fuel adsorbing material 11 through the mesh filter 25 via the conduit 32 and the check valve 33.

The release port 31 is connected to the refuelling port 22 through a further conduit 34, and an opening and closing valve 35 is provided in the midst of the conduit 34. This opening and closing valve 35 is automatically opened responsive to the condition that a feeding nozzle 36 is inserted into a fuel feeding pipe 20, and thus evaporative gasoline generated within the fuel tank 6 at the time of feeding is introduced into the lower space 18 through the refuelling port 22 via the conduit 34 and the opening and closing valve 35.

The fuel pump 9 installed within the fuel tank 6 is electrically operated, and when a power supply is connected, pumps up fuel within the fuel tank 6 through a strainer 40 to feed under pressure fuel to the fuel injection valve 5 through a fuel pipe 41.

A return pipe 42 is connected to the fuel pipe 41, and this return pipe 42 is provided with a constant pressure valve 43. This constant pressure valve 43 maintains constant a pressure of fuel fed under pressure from the fuel pump 9 to the fuel injection valve 5 through the fuel pipe 41, and the surplus fuel resulted from the constant pressure control is returned to the fuel tank 6 through the return pipe 42. In this case, in the illustrated embodiment, a return port 44 is formed in the fuel feeding pipe 20, and the return pipe 42 is connected to the return port 44. Thus, the return fuel is returned to the fuel feeding pipe 20.

In the following, the evaporative fuel treating apparatus in accordance with the first embodiment constructed as described above is operated as follows:

When the vehicle is parked evaporative gasoline generated within the fuel tank 6 is introduced into the tank port 21 via the check valve 33 from the discharge port 30 through the conduit 32 and is scattered on the fuel adsorbing material 11 such as activated carbon through the mesh filter 25. A fuel component in the scattered evaporative fuel is adsorbed by the fuel adsorbing material 11, and only clean air with the fuel component removed is discharged into the upper space 17, from which it is released through the atmospheric port 23 and filter 26.

At the time of fuel feeding, a feeding cap, not shown, which blocks an end opening of the fuel feeding pipe 20, is removed, and the feeding nozzle 36 is inserted into the fuel feeding pipe to pour fuel.

The poured fuel is supplied to the small fuel storage chamber 8 formed between the canister C and the sub-tank 7 through the central passage of the canister container 10 through the fuel feeding pipe 20. With this, an oil level within the small fuel storage chamber 8 of the sub-tank 7 rises, and when this level exceeds the opening 38, the supplied fuel overflows, and fuel is poured into the fuel tank 6 from the opening 38. The small hole 39 formed in the lower part of the sub-tank 7 is made sufficiently small that a quantity of gasoline flowing into the tank 6 from the small hole 39 when gasoline is fed is small.

Fuel vapors generated when fuel filled into the fuel tank and fuel vapors formed within the fuel tank 6 at other times are introduced from the release port 31 to the refuelling port 22 through the conduit 34. When the feeding nozzle 36 is inserted into the fuel feeding pipe 20, the opening and closing valve 35 is automatically opened. This causes the release port 31 and the refuelling port 22 to communicate with each other through the conduit 34 whereby the evaporative gasoline within the fuel tank 6 is fed into the lower space 18 of the canister container 10 from the refuelling port 22, and then scattered.

The evaporative fuel scattered in the lower space 18 is gradually adsorbed as it flows upwardly from the lower part of the fuel adsorbing material 11, and only clean air with the fuel component removed is discharged into the upper space 17, from which it is released to the atmosphere through the atmospheric port 23 and the filter 26.

When HC or the like is adsorbed by the fuel adsorbing material 11, heat is generated. As the fuel adsorbing material 11 increases in temperature due to the heat of adsorption, the adsorbing ability of the fuel adsorbing material 11 deteriorates.

In this embodiment, low temperature fuel being fed into the fuel tank flows to the small fuel storage chamber 8 formed between the canister C and the sub-tank 7 via the central passage of the canister container 10 through the fuel feeding pipe 20. This lowers the temperature in the small fuel storage chamber 8 which, in turn, helps to keep the temperature of the canister C from rising due to the heat of adsorption. Low temperature fuel passes around the fuel adsorbing material 11 and fuel whose thermal capacity is relatively great stays. Therefore sufficient heat exchange is carried out between the fuel adsorbing material 11 and the fuel. For this reason, heat generated in the fuel adsorbing material 11 with the adsorption of fuel is transferred to the low temperature fuel feeding into the fuel tank and the temperature rise of the canister, with its attendant deterioration of the adsorbing ability of the adsorbing material 11 is prevented.

When the vehicle is being operated, it is desireable for the adsorbing material 11 to "reverse" its operation and carry out de-adsorption to regenerate the fuel adsorbing material 11 by separating the previously adsorbed fuel. To promote de-adsorbing action of the adsorbing material 11, it is desireable to raise its temperature. According to the present invention, when the engine is being operated, such as, for example, during normal driving, the structural arrangement provided by the present invention raises the temperature of the canister to promote de-adsorbing action.

More specifically, when the engine is operated, a negative pressure develops in the intake passage 2. This negative pressure is conducted to purge port 24 through the negative pressure conduit 27. Since the purge port 24 communicates with the lower space 18 of the canister container 10, the lower space also becomes negative pressure. Therefore, external air is drawn in by this negative pressure from the atmospheric port 23. This incoming air sucks toward the lower space 18 from the upper space 17 through the interior of the fuel adsorbing material 11. Fuel components having been previously adsorbed by the fuel adsorbing material 11 is separated by the air, and the air containing the fuel component is sucked into the intake passage 2 of the engine through the negative pressure conduit 27. Thus, the fuel adsorbing material 11 is regenerated to again restore the ability of adsorbing the fuel component.

On the other hand, when the engine is operated, as described above, the fuel pump 9 is also operated while being connected to the power supply to pump up fuel within the fuel tank 6 to feed pressurized fuel to the fuel injection valve 5 through the fuel pipe 41. This fuel injection valve 5 injects a part of fuel supplied from the fuel pump 9 to the intake passage 2 or to a combustion chamber (depending on the design of the engine). The residual fuel that is not injected is fed back to the fuel tank. Surplus fuel, not injected is controlled by the constant pressure valve 43 and fed into the fuel feeding pipe 20 from the return pipe 42 through the return port 44. This surplus return fuel is high in temperature because it has passed through the periphery of the combustion chamber of the engine. Accordingly, the fuel supplied from the fuel feeding pipe 20 to the small fuel storage chamber 8 via the central passage of the canister container 10 is relatively high temperature fuel. This high temperature fuel heats canister C and the fuel adsorbing material contained therein. This promotes de-adsorbing action of the fuel adsorbing material 11 so that it is rapidly regenerated and purified.

The periphery of the canister C comprises the small fuel storage chamber 8 surrounded by the sub-tank 7 and is separated from the fuel tank 6. Therefore, even in the case of a low quantity of return fuel having passed through the engine, warmed and returned to the fuel tank, the temperature of the canister C will not fall rapidly due to the small capacity of the small fuel storage chamber 8. This helps to maintain the temperature of canister C as high as possible.

High temperature return fuel is introduced into the sub-tank 7 through the return port 44 formed in a part of the fuel feeding pipe 20. Therefore, the fuel feeding pipe 20 serves duel purposes and its structure is efficiently utilized. This keeps the structural arrangement of the present invention simple.

Because the engine is not operated when the fuel tank is being filled, low temperature fuel (gasoline being filled into the tank) and high temperature return fuel do not simultaneously pass through the fuel feeding pipe 20. Thus, there is no problem in utilizing the fuel feeding pipe 20 for both low and high temperature fuel.

If the remaining amount of fuel within the fuel tank 6 becomes low, fuel within the small fuel storage chamber 8 flows into the fuel tank 1 through the small hole 39 open to the lower surface of the sub-tank 7. This allows all of the fuel within the tank to be consumed.

Figure 2:
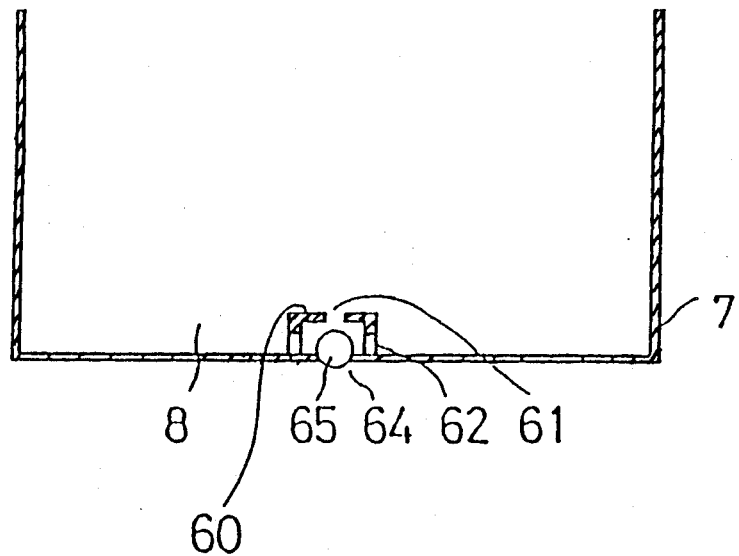
FIG. 2 is a sectional view of a sub-tank of a second embodiment of the invention.

FIG. 2 is a sectional view of a sub-tank used for an evaporative fuel treating apparatus according to a second embodiment of the present invention. In the second embodiment, since the construction is exactly the same as that of the first embodiment except for the sub-tank, and the entire system is neither shown nor described.

In the second embodiment, a float valve 65 surrounded by a holder 60 having openings 61, 62 and 64 is provided in place of the small hole 39 at the lower portion of the sub-tank 7 in the first embodiment. When fuel is filled into the fuel tank, the float valve 65 is downwardly urged and moved through the opening 61 under the pressure of the incoming fuel to thereby close the opening 64 in the lower wall of the sub-tank 7, whereby a flow of fuel between the interior of the fuel tank 6 and the interior of the sub-tank 7 is cut off.

At times other than fuel filling, the float valve 65 is moved upward due to its buoyancy, and the opening 64 in the lower wall of the sub-tank 7 is opened to allow a flow of fuel between the interior of the fuel tank 6 and the interior of the sub-tank 7.

Figure 3:
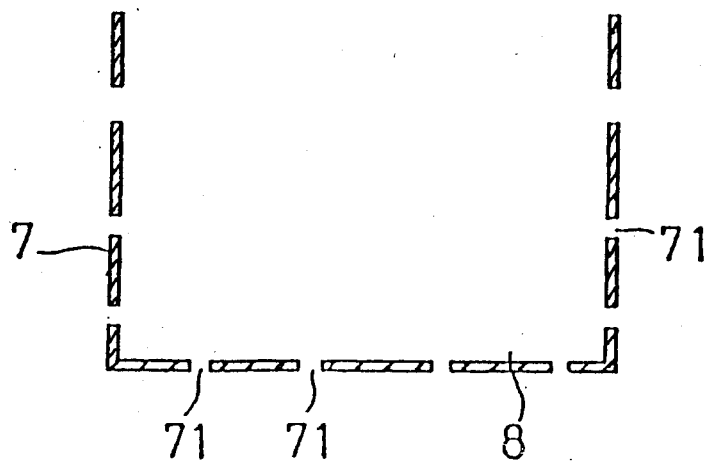
FIG. 3 is a sectional view of a sub-tank of a third embodiment of the invention.

FIG. 3 is a sectional view of a sub-tank 7 used for a third embodiment of the present invention. The construction is exactly the same as that of the first embodiment except for sub-tank 7. Therefore the entire system is neither illustrated nor discussed. Even if a plurality of small holes 71 are provided around the sub-tank 7 as shown in FIG. 3, substantially the equal effect may be obtained by the simple structure.

FIGS. 4 and 5 show a fourth embodiment of the present invention. In this embodiment, members having the same function as those shown in the first embodiment are indicated by the same reference numeral as used in the first embodiment, and the description thereof is omitted. Fuel pump 9 is housed in the canister C. The fuel pump 9 is encased within the central hole of the canister container 10, and is retained at a central part of the central hole of the canister container 10 by a holder 101 shown in FIG. 5 and secured to the lower surface of the canister container 10 by means of a bracket 102 through a bolt 103. A discharge opening 9a of the fuel pump 9 is connected in liquid-tight fashion by a sealing member such as an 0-ring 105 to a pressure feed port 104 formed in the fuel feeding pipe 20.

The sub-tank 7 as a partitioning wall which forms the small fuel storage chamber 8 uses this bottom wall common to the bottom wall of the fuel tank 6, and the interior of the sub-tank 7 and the interior of the fuel tank 6 are brought into conduction through the small hole 39 opened to the side portion. A strainer 40 of the fuel pump 9 is installed on the bottom wall common to the sub-tank 7 and fuel tank 6.

In the fourth embodiment, when fuel is filled into the fuel tank, a cap 106 is removed to pour fuel from a feeding nozzle (not shown) inserted into the fuel feeding pipe 20, whereby low temperature incoming fuel cools the canister C to prevent a temperature rise of the fuel adsorbing material 11 to maintain the adsorbing ability at a high level. When the engine is operated, such as when the vehicle is being driven, fuel components having been previously adsorbed on the fuel adsorbing material 11 are separated and sucked into the intake passage 2 of the engine. A part of fuel fed under pressure from the fuel pump 9 is returned at high temperature to warm canister C and promote de-adsorbing action in a similar fashion to the first embodiment.

Because fuel pump 9 is encased in the central hole of the canister container 10 in the canister C, the operating noises generated when the fuel pump 9 are suppressed. Even during high engine output, the fuel pump operating noises are effectively muffled by the structural arrangement of the present invention. The fuel pump 9 is surrounded by the canister C and the fuel adsorbing material 11 such as activated carbon contained therein. These serve as a sound shield wall which absorbs a major portion of the operating noises of the fuel pump 9.

In addition, since the fuel pump 9 is secured within the central hole of the canister container 10 through the holder 101 and the bracket 102, if the fuel pump 9 and the canister C are integrally pre-assembled prior to the accommodation thereof within the fuel tank 6, the integral incorporation may be attained. Assembly is easier than for structures wherein the fuel pump 9 and the canister C are separately installed.

Moreover, since, in this embodiment, sub-tank 7 and the bottom wall of the fuel tank 6 share a common bottom wall, and the strainer 40 of the fuel pump 9 is installed on the common bottom wall, even if the remaining amount of fuel in the fuel tank 6 is small, the fuel may be effectively pumped up by the fuel pump 9. Therefore, the last remaining fuel in the tank may be effectively used by the vehicle.

FIG. 6 shows a fifth embodiment of the present invention. In the aforementioned first to fourth embodiments, an example has been described in which the fuel feeding pipe 20 is formed at the upper part opposed to the central hole of the doughnut type canister container 10. However, the fifth embodiment provides an arrangement wherein the fuel feeding pipe 120 is formed on one side of the fuel tank 6, and therefore the fifth embodiment is different from the first to fourth embodiments in that the small fuel storage chamber 8 is formed on one side of the fuel tank 6 by the provision of a partitioning wall 121. Canister C is housed in the small fuel storage chamber 8 and the fuel pump 9 is housed in the central portion of the canister C. Canister C may be cooled by the low temperature fuel poured through the fuel feeding pipe 120, and the noises generated from the fuel pump 9 may be cut off by the canister C. The discharge opening 9a of the fuel pump 9 and the pressure feed port 104 may also be connected by use of a fuel hose 122. Reference numeral 123 designates a hose band. The fuel pump 9 is supported by a pump holder 126 formed on a cover plate 125.

Figure 8:
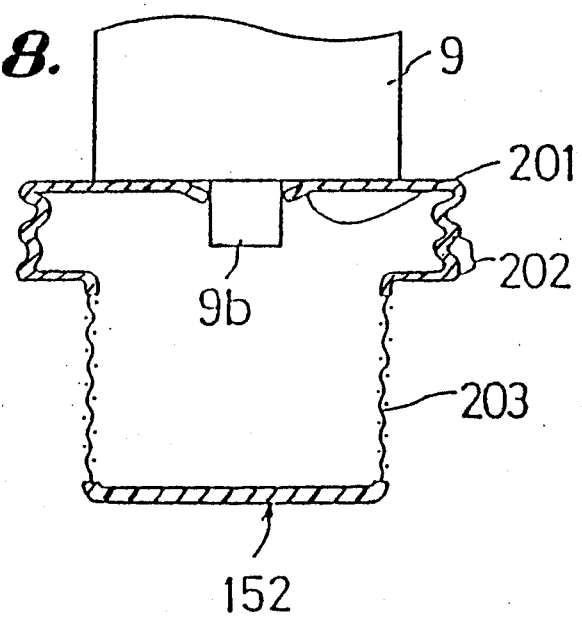
FIG. 8 is a sectional view showing the detailed construction of a strainer forming a part of the present invention.

FIGS. 7 and 8 show a sixth embodiment of the present invention. The sixth embodiment defines a canister C housing portion and a strainer housing portion of a fuel pump 9. More specifically, the sub-tank 7 is divided up and down by a horizontal partitioning wall 151. Canister C is housed in the small fuel storage chamber 8 formed at the upper part, and the fuel pump 9 is housed in the central portion of the canister C. A strainer 152 of the fuel pump 9 is installed on a fuel pump-up chamber 153 formed at the lower part. The small fuel storage chamber 8 and the fuel pump-up chamber 153 which are divided by the horizontal partitioning wall 151 are communicated with each other by a communication pipe 154 and a float valve 155. The fuel pump-up chamber 153 is communicated with the fuel tank 6 through the small hole 39.

At the time of fuel feeding, when the small fuel storage chamber 8 is filled with fuel supplied from the fuel feeding pipe 20, the fuel overflows from the opening 38 and flows into the fuel tank 6. Fuel is supplied from the small fuel storage chamber 8 to the fuel pump-up chamber 153 through a communication pipe 154, and fuel flows through the small hole 39 from the fuel tank 6. The float valve 155 is set so that when the fuel pump-up chamber 153 is filled with fuel, the valve 155 receives buoyancy and is then closed, and when the fuel within the fuel pump-up chamber 153 decreases, the valve 155 is opened.

The construction of the strainer 152 is shown in detail in FIG. 8. The strainer 152 in this embodiment includes a resilient holding portion 201 for holding an intake opening 9b of the fuel pump 9, a resilient pressing portion 202 installed between the fuel pump 9 and the horizontal partitioning wall 151 to press them under a predetermined pressure, and a mesh filter 203. The strainer 152 has its outside diameter smaller than the inside diameter of the canister C and is mounted at the same time when the fuel pump 9 is mounted on the canister C and is housed in the small fuel storage chamber 8 in an integral fashion.

In the case of the sixth embodiment constructed as described above, when the engine is operated to actuate the fuel pump 9, the fuel pump 9 pumps up fuel in the fuel pump-up chamber 153 through the strainer 152. When return fuel, heated by the engine, is returned from the return port 44, this fuel flows into the small fuel storage chamber 8 from the fuel feeding pipe 20 to warm the canister C.

When the fuel in the fuel pump-up chamber 153 is consumed by the operation of the fuel pump 9, fuel is supplied from the small fuel storage chamber 8 to the fuel pump-up chamber 153 through the communication pipe 154, and the fuel flows from the fuel tank 6 through the small hole 39.

In the small fuel storage chamber 8, a liquid level is lowered as the fuel is consumed. When the fuel level lowers to a level indicated at a, fuel will not overflow from the opening 38 but the fuel is replenished to the fuel pump-up chamber 153 through the communication pipe 154. However, when the level lowers to a level indicated at b, fuel in the small fuel storage chamber 8 will not flow into the fuel pump-up chamber 153, even through the communication pipe 154. Accordingly, the liquid level maintains the level of b. As a result, since the fuel in the small fuel storage chamber 8 maintains the level of b, the canister C is immersed in fuel to satisfactorily urge heating by the return fuel.

As an alternative embodiment, the communication pipe 154 can be eliminated so that the fuel overflow level is a rather than b. But, in this embodiment, the size of the hole 39 must be large enough to allow the fuel required by fuel pump 9 to flow from the fuel tank 6 to the fuel pump-up chamber.

If the fuel in the fuel tank 6 is decreased by consumption of fuel and the oil level of the fuel pump-up chamber 153 is low, the float valve 155 is opened. Fuel having been stored to level b flows into the fuel pump-up chamber 153 from the float valve 155. Since the thus flowed fuel is pumped up from the strainer 152 of the fuel pump 9, the fuel may be consumed and does not remain in the fuel tank 6.

Figure 9:
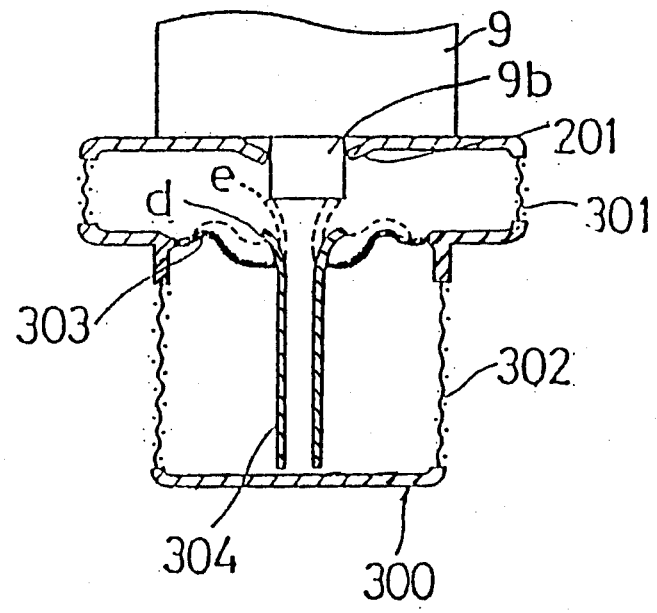
FIG. 9 is a sectional view showing a construction of an alternative construction of a strainer forming a part of the present invention.

FIG. 9 shows another embodiment of a strainer. Strainer 300 is composed of a mesh filter 301 for causing fuel in the small fuel storage chamber 8 to pass through the upper peripheral wall, a mesh filter 302 for causing fuel in the fuel pump-up chamber 153 to pass through the lower peripheral wall, a diaphragm 303 for defining these upper and lower chambers therein, and an opening and closing valve port 304 mounted on the diaphragm 303.

When the fuel pump 9 is not operating, the opening and closing port 304 is in a position d as indicated by the solid line. However, when the fuel pump is being operated, the opening and closing valve port 304 is raised by a suction force to a position of a phantom line e as indicated by the broken line. With this, communication between the mesh filter 301 communicated with the small fuel storage chamber 8 and the intake opening 9b of the fuel pump 9 is disconnected, and the intake opening 9b of the fuel pump 9 is communicated with the fuel pump-up chamber 153 through the mesh filter 302, thus sucking the fuel in the fuel pump-up chamber 153.

When the pressure in the fuel pump-up chamber 153 is reduced by the consumption of fuel in the fuel tank 6, the pressure in the small fuel storage chamber 8 relatively increases, and thus the opening and closing port 304 is shifted to a position of d as indicated by the solid line. As the result, the fuel pump 9 pumps up fuel within the small fuel storage chamber 8. If this strainer 300 is used, the float valve 155 shown in FIG. 7 need not be used.

As described in detail, according to the present invention, at the time fuel is being fed into the fuel tank, the incoming fuel is fed into the small fuel storage chamber to cool canister C. This enhances the adsorbing ability of the fuel adsorbing material contained within the canister. When the engine is operated, high temperature return fuel is introduced into the small fuel storage chamber to heat canister container C and promote de-adsorbing action by the adsorbing material contained therein to encourage the separation of fuel previously adsorbed.

Thus, according to the present invention, separate cooling and heating apparatus are not required to enhance adsorbing action and de-adsorbing action. This allows the structure to be made relatively uncomplicated. Because the canister container is housed in the fuel tank, no particular space is required which allows the apparatus to be made relatively small. Moreover, since the fuel tank having a large capacity is subdivided by the partitioning wall into the small fuel storage chamber, a small thermal capacity will suffice, and the efficiency of heat transfer between the low temperature feeding fuel and high temperature return fuel and the canister container is high.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An apparatus for treating evaporative fuel used by an internal combustion engine, comprising:
   a fuel tank;
   a partitioning wall provided within the fuel tank to define a small fuel storage chamber within the tank;
   a canister container housed in the small fuel storage chamber;
   fuel adsorbing material stored with the canister;
   a fuel feeding pipe for feeding fuel into the small fuel storage chamber; and
   a fuel return pipe for introducing high temperature return fuel into the small fuel storage chamber;
   the above-mentioned elements being arranged such that when fuel is introduced into the tank, it flows into the small fuel storage chamber through the fuel feeding pipe to cool the canister container whereas when the engine is operated, high temperature return fuel is introduced into the small fuel storage chamber through the fuel return pipe to heat the canister container thereby promoting an adsorbing and de-adsorbing action of fuel by the fuel adsorbing material.

2. An apparatus for treating evaporative fuel used by an internal combustion engine, comprising:
   a fuel tank;
   a partitioning wall provided within the fuel tank to define a small fuel storage chamber within the tank;
   a canister container housed in the small fuel storage chamber;
   fuel adsorbing material stored within the canister; and
   a single fuel feeding pipe for feeding fuel into the small fuel storage chamber and introducing the high temperature return fuel into the small fuel storage chamber, thereby promoting an adsorbing and de-adsorbing action of fuel by the fuel adsorbing material.

3. An apparatus according to claim 1, wherein the partitioning wall for defining the small fuel storage chamber has at least one hole therethrough permitting fuel to flow between the small chamber and the rest of the fuel tank.

4. An apparatus according to claim 3, further comprising a control valve for controlling the flow of fuel between the small fuel storage chamber and the rest of the fuel tank.

5. An apparatus according to claim 1, wherein
the canister container is in the form of a doughnut, and
the apparatus further comprises a fuel pump installed in a central portion of the doughnut-shaped canister container.

6. An apparatus for treating evaporative fuel in an internal combustion engine vehicle comprising:
a fuel tank for storing fuel therein;
means for defining a small fuel storage chamber within the fuel tank;
a canister container housed in the small fuel storage chamber;
a fuel adsorbing material stored in the canister container;
means for defining a fuel pump-up chamber;
a fuel pump for pumping-up fuel to the engine, the fuel pump having a strainer housed within the fuel pump-up chamber; and
an opening and closing means which communicates the small fuel storage chamber with the fuel pump-up chamber, fuel being introduced into the fuel tank flowing into the small fuel storage chamber to cool the canister container to promote adsorbing action of the adsorbing material, high temperature return fuel being introduced into the small storage chamber, when the internal combustion engine is operated, to heat the canister container thereby promoting de-adsorbing action of the adsorbing material, a predetermined amount of fuel being retained in the small fuel storage chamber such that when fuel in the fuel pump-up chamber decreases, the opening and closing means opens to allow fuel in the small fuel storage chamber to flow into the fuel pump-up chamber.

7. An apparatus according to claim 6, wherein the strainer includes at the upper peripheral wall thereof a first filter for causing fuel in the small fuel storage chamber to pass through and at the lower peripheral wall thereof a second filter for causing fuel in the fuel pump-up chamber to pass through, the strainer further including a diaphragm therein for defining a first space provided in the first filter and a second space provided in the second filter, the diaphragm being provided with an opening and closing port for controlling communications and interruption between the first space and the second space.

8. An apparatus according to claim 6 wherein the small fuel chamber defining means and the pump-up chamber defining means are constituted by a single wall element.

9. An apparatus according to claim 6 wherein the canister container is in the form of a doughnut, and the fuel pump is installed in a central portion thereof.

10. An apparatus according to claim 6 wherein the opening and closing means is a float valve.

11. An apparatus according to claim 6 further comprising a single fuel feeding pipe for feeding fuel into the small fuel storage chamber and introducing the high temperature return fuel into the small fuel storage chamber.

12. An apparatus according to claim 6 wherein the fuel pump-up chamber defining means has at least one hole therethrough permitting fuel to flow between the fuel pump-up chamber and the rest of the fuel tank.

* * * * *